(12) United States Patent
Yum et al.

(10) Patent No.: US 10,433,293 B2
(45) Date of Patent: Oct. 1, 2019

(54) METHOD AND APPARATUS FOR RECEIVING OR TRANSMITTING DOWNLINK SIGNAL IN A WIRELESS COMMUNICATION SYSTEM

(71) Applicant: LG ELECTRONICS INC., Seoul (KR)

(72) Inventors: Kunil Yum, Seoul (KR); Hyungtae Kim, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/638,253

(22) Filed: Jun. 29, 2017

(65) Prior Publication Data

US 2018/0007668 A1    Jan. 4, 2018

Related U.S. Application Data

(60) Provisional application No. 62/454,894, filed on Feb. 5, 2017, provisional application No. 62/453,512, filed on Feb. 2, 2017, provisional application No. 62/355,894, filed on Jun. 29, 2016.

(51) Int. Cl.
*H04W 72/04* (2009.01)
*H04L 5/00* (2006.01)
*H04L 1/00* (2006.01)
*H04L 1/06* (2006.01)

(52) U.S. Cl.
CPC ......... *H04W 72/042* (2013.01); *H04L 1/0026* (2013.01); *H04L 1/0067* (2013.01); *H04L 1/0606* (2013.01); *H04L 5/0037* (2013.01); *H04L 5/0051* (2013.01); *H04L 5/001* (2013.01); *H04L 5/005* (2013.01); *H04L 5/0055* (2013.01)

(58) Field of Classification Search
CPC .. H04W 72/042; H04L 1/0026; H04L 1/0067; H04L 1/0606; H04L 5/0037; H04L 5/0051; H04L 5/001; H04L 5/005; H04L 5/0055
See application file for complete search history.

(56) References Cited

U.S. PATENT DOCUMENTS

| | | | |
|---|---|---|---|
| 2011/0170631 A1* | 7/2011 | Kim ............... | H04L 5/0007 375/296 |
| 2011/0194551 A1* | 8/2011 | Lee ............... | H04B 7/0626 370/342 |
| 2015/0131560 A1* | 5/2015 | Von Elbwart ..... | H04L 5/0042 370/329 |

* cited by examiner

*Primary Examiner* — Eric Myers
(74) *Attorney, Agent, or Firm* — Lee Hong DeGerman Kang Waimey

(57) ABSTRACT

A method for receiving a downlink signal according to a Demodulation Reference Signal (DMRS)-based transmission scheme, performed by a mobile terminal, in a wireless communication system is disclosed. The method includes receiving indication information indicating whether rate matching or timewise Resource Element (RE) pairing is allowed for REs that do not constitute frequency-wise RE pairs for Space Frequency Block Coding (SFBC) on symbols to which DMRSs are mapped in a Resource Block (RB) for a DL data channel, and decoding the downlink data channel, on assumption that the REs that do not constitute frequency-wise RE pairs for SFBC are rate-matched, or constitute time-wise RE pairs to which transmission data is mapped, according to the indication information.

2 Claims, 18 Drawing Sheets

METHOD AND APPARATUS FOR RECEIVING OR TRANSMITTING DOWNLINK SIGNAL IN A WIRELESS COMMUNICATION SYSTEM

This application claims the benefit of U.S. Provisional Application No. 62/355,894, filed on Jun. 29, 2016, 62/453,512, filed on Feb. 2, 2017, and 62/454,894, filed on Feb. 5, 2017, which are hereby incorporated by reference as if fully set forth herein.

BACKGROUND OF THE INVENTION

Field of the Invention

The present disclosure relates to a wireless communication system, and more particularly, to an apparatus for receiving or transmitting a downlink signal.

Discussion of the Related Art

To support enhanced Full Dimension Multiple Input Multiple Output (eFD-MIMO), it is under consideration to modify a legacy diversity transmission scheme. Particularly, the easy use of precoding (e.g., W1) is sought after by introducing a Demodulaton Reference Signal (DMRS)-based Open Loop (OL) MIMO scheme using DMRSs instead of Cell-specific Reference Signals (CRSs).

As such a DMRS-based OL MIMO scheme, a semi-OL MIMO scheme is additionally considered besides legacy pure OL MIMO (e.g. Space Frequency Block Coding (SFBC) or Large Delay Cyclic Delay Diversity (LD-CDD)), such as a diversity transmission scheme that uses a report of part of channel state information (CSI) (e.g. W1 for 8-tx Long Term Evolution (LTE) Precoding Matrix Indicator (PMI)) and utilizes the remaining non-reported CSI (e.g. W2 for 8-tx LTE PMI is cycled in units of a Physical Resource Block (PRB)).

The present disclosure proposes a method for signaling and feedback to use DMRS-based OL MIMO.

SUMMARY OF THE INVENTION

Accordingly, the present disclosure is directed to a method and apparatus for receiving or transmitting a downlink signal in a wireless communication system, which substantially obviate one or more problems due to limitations and disadvantages of the related art.

One aspect of the present disclosure is to provide a method for reporting a channel state. More particularly, the present disclosure is intended to provide an aperiodic channel state reporting method for a Narrow Band (NB) Internet of Things (IoT) User Equipment (UE).

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

In an aspect of the present disclosure, a method for receiving a downlink signal according to a Demodulation Reference Signal (DMRS)-based transmission scheme, performed by a mobile terminal, in a wireless communication system includes receiving indication information indicating whether rate matching or timewise Resource Element (RE) pairing is allowed for REs that do not constitute frequency-wise RE pairs for Space Frequency Block Coding (SFBC) on symbols to which DMRSs are mapped in a Resource Block (RB) for a DL data channel, and decoding the downlink data channel, on the assumption that the REs that do not constitute frequency-wise RE pairs for SFBC are rate-matched, or constitute time-wise RE pairs to which transmission data is mapped, according to the indication information.

Additionally or alternatively, the method may further include designating first REs on symbols to which DMRSs are mapped in each RB as the REs that do not constitute frequency-wise RE pairs for SFBC.

Additionally or alternatively, data allocation may be performed to as the constituted time-wise RE pairs from among the REs that do not constitute frequency-wise RE pairs for SFBC, before data allocation is performed to remaining REs on each of symbols to which DMRSs are mapped.

Additionally or alternatively, data allocation may be performed to the constituted time-wise RE pairs from among the REs that do not constitute frequency-wise RE pairs for SFBC, after data allocation is performed to remaining REs on each of symbols to which DMRSs are mapped.

Additionally or alternatively, the RB may be a last RB when an odd number of RBs are allocated to the mobile terminal.

Additionally or alternatively, the RB may be a last RB of each of RB blocks when the RB blocks each consisting of an odd number of contiguous RBs are allocated to the mobile terminal.

Additionally or alternatively, the RB may be a last RB of each of RB blocks when one or more RB groups each consisting of a predetermined number of RBs are allocated and RB blocks each consisting of an odd number of contiguous RBs in each RB group are allocated for the mobile terminal.

In another aspect of the present disclosure, a mobile terminal for receiving a downlink signal according to a DMRS-based transmission scheme in a wireless communication system includes a transmitter, a receiver, and a processor configured to control the transmitter and the receiver. The processor is configured to receive indication information indicating whether rate matching or timewise RE pairing is allowed for REs that do not constitute frequency-wise RE pairs for SFBC on symbols to which DMRSs are mapped in an RB for a DL data channel, and decode the downlink data channel, on the assumption that the REs that do not constitute frequency-wise RE pairs for SFBC are rate-matched, or constitute time-wise RE pairs to which transmission data is mapped, according to the indication information.

Additionally or alternatively, the processor may be configured to designate first REs on symbols to which DMRSs are mapped in each RB as the REs that do not constitute frequency-wise RE pairs for SFBC.

Additionally or alternatively, data allocation may be performed to as the constituted time-wise RE pairs from among the REs that do not constitute frequency-wise RE pairs for SFBC, before data allocation is performed to remaining REs on each of symbols to which DMRSs are mapped.

Additionally or alternatively, data allocation may be performed to the constituted time-wise RE pairs from among the REs that do not constitute frequency-wise RE pairs for SFBC, after data allocation is performed to remaining REs on each of symbols to which DMRSs are mapped.

Additionally or alternatively, the RB may be a last RB when an odd number of RBs are allocated to the mobile terminal.

Additionally or alternatively, the RB is a last RB of each of RB blocks when the RB blocks each consisting of an odd number of contiguous RBs are allocated to the mobile terminal.

Additionally or alternatively, the RB may be a last RB of each of RB blocks when one or more RB groups each consisting of a predetermined number of RBs are allocated and RB blocks each consisting of an odd number of contiguous RBs in each RB group are allocated for the mobile terminal.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
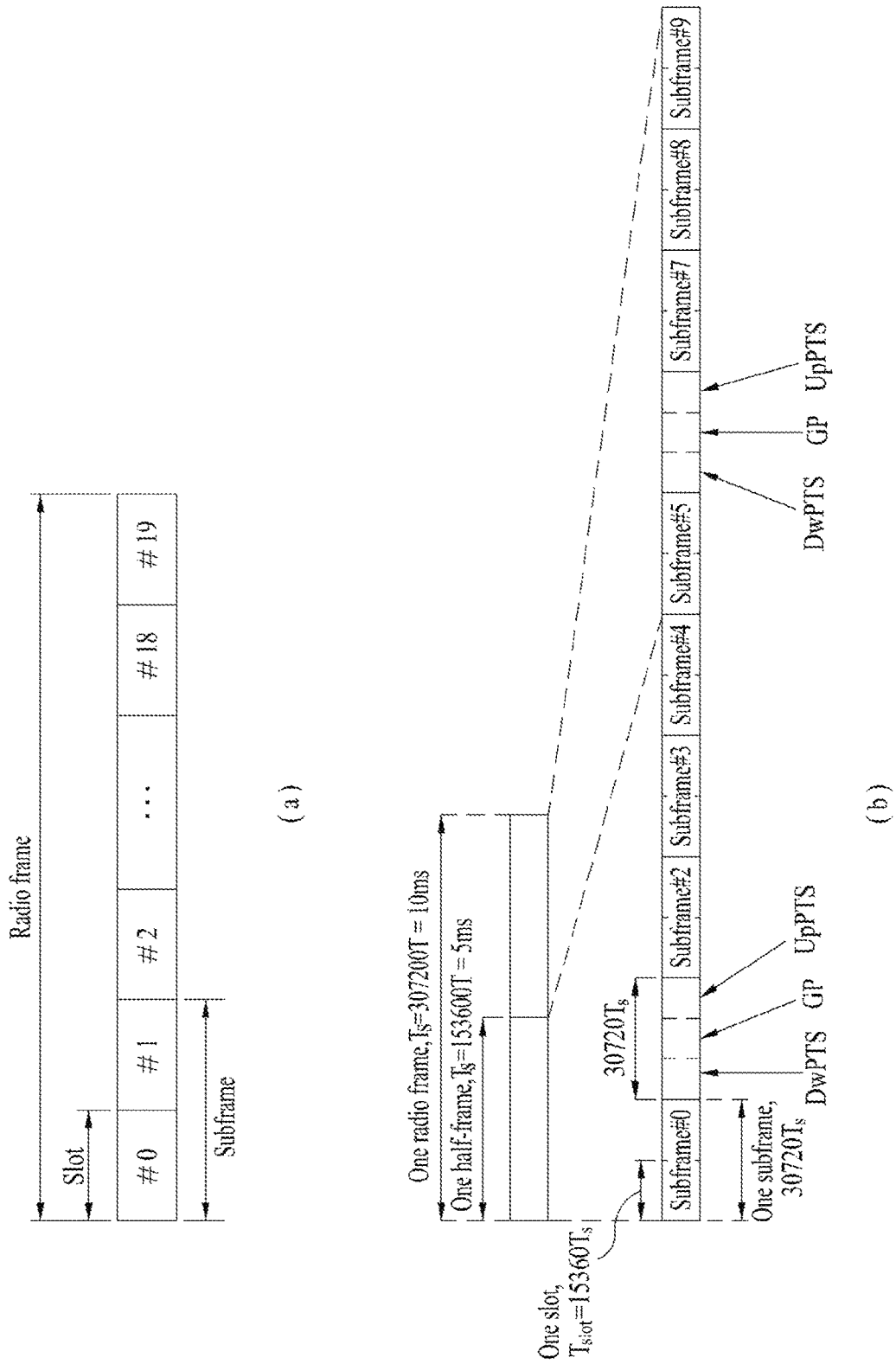
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCHWPRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
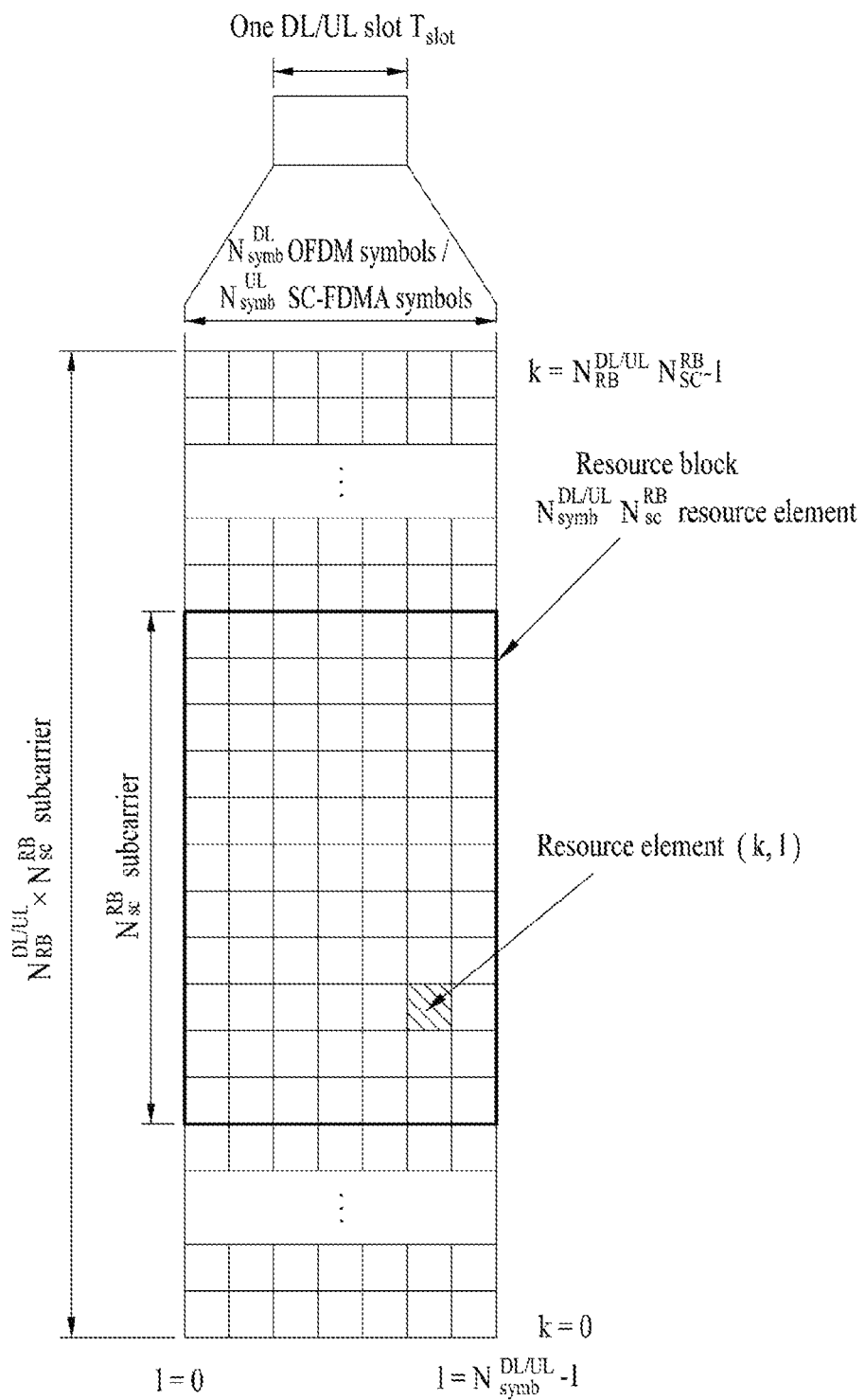
FIG. 2 illustrates an exemplary Downlink (DL)/Uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{UL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
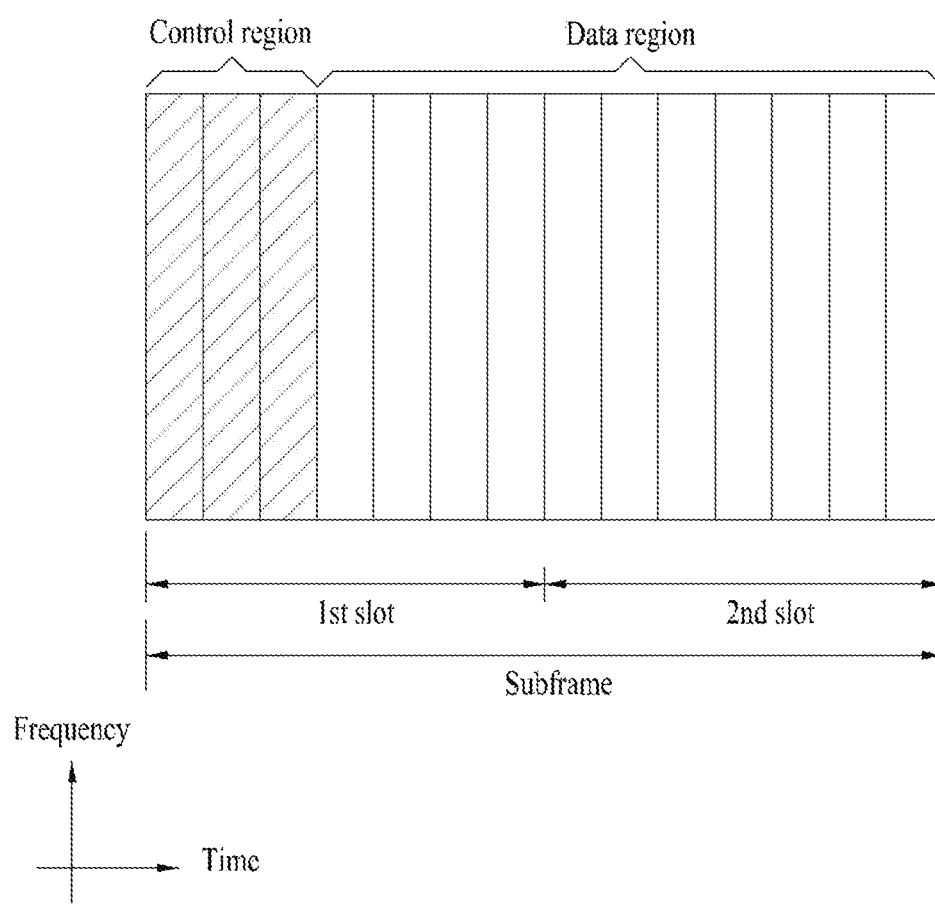
FIG. 3 illustrates an exemplary DL subframe structure in a $3^{rd}$ Generation Partnership Project (3GPP) Long Term Evolution (LTE)/LTE-Advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PC-FICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space Type | Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
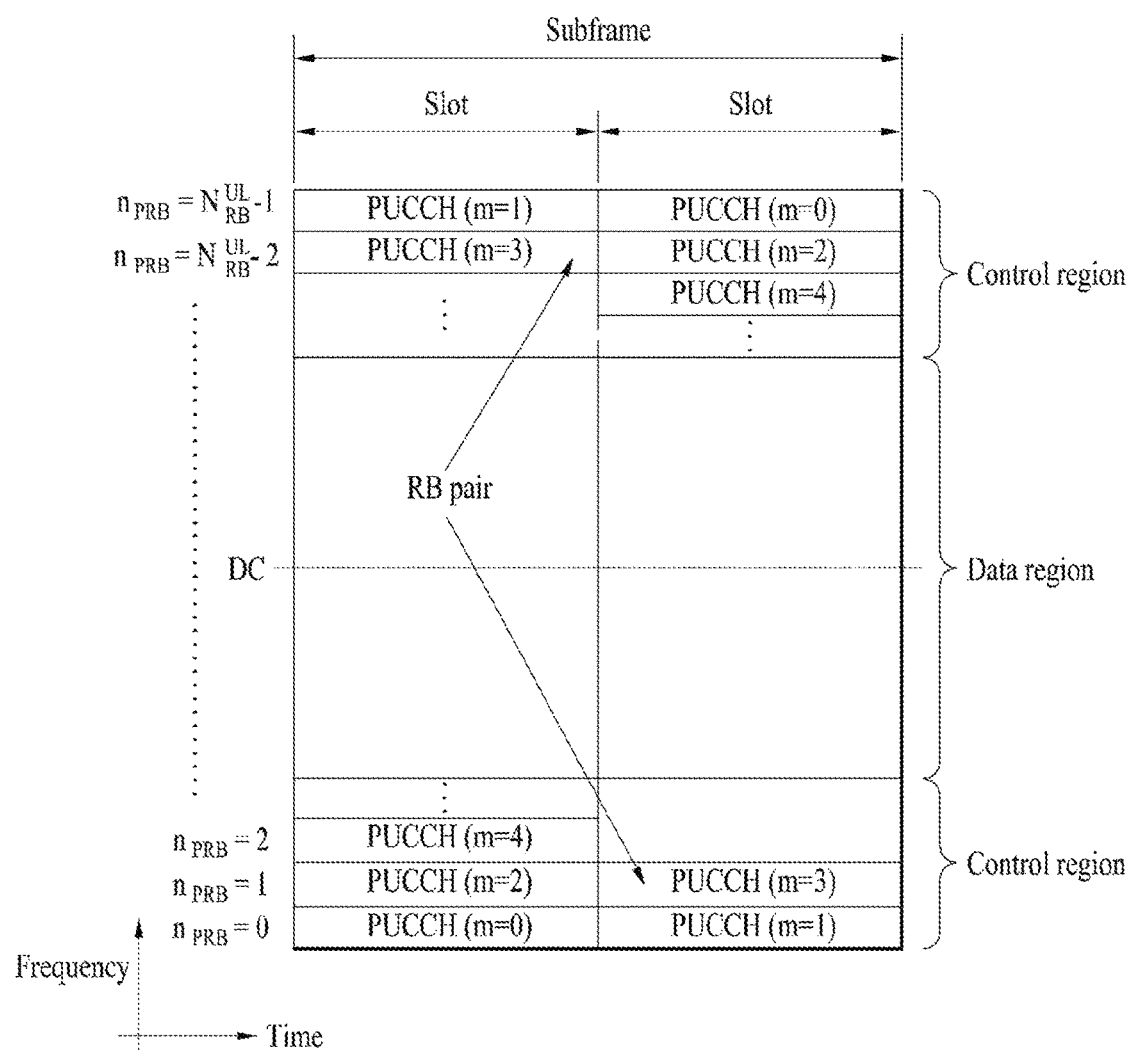
FIG. 4 illustrates an exemplary UL subframe structure in the 3GPP LTE/LTE-A system.
Figure 5:
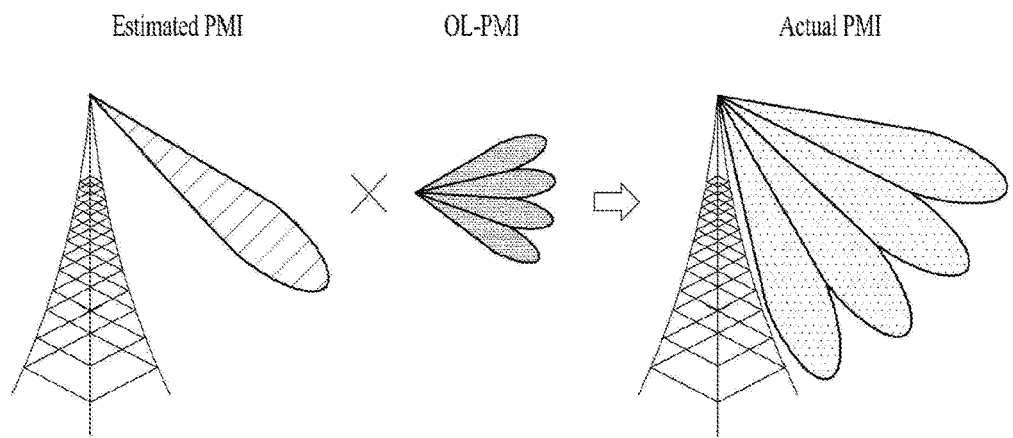
FIG. 5 illustrates a semi-Open Loop (semi-OL) Multiple Input Multiple Output (MIMO) feedback using an explicit feedback.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

|  | PMI Feedback Type | | |
|---|---|---|---|
|  | No PMI | Single PMI | Multiple PMIs |
| PUSCH CQI Feedback Type | Wideband (Wideband CQI) |  |  | Mode 1-2 RI 1st wideband CQI (4 bit) 2nd wideband CQI (4 bit) if RI >1 N * Subband PMI (4 bit) (N is the total # of subbands) (if 8Tx Ant, N * subband W2 + wideband W1) |

TABLE 6-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband CQI (4 bit) + Best-M CQI (2 bit)<br>(Best-M CQI: An average CQI for M SBs selected from among N SBs)<br>Best-M index (L bit) | | Mode 2-2<br>RI<br>1st wideband CQI (4 bit) + Best-M CQI (2 bit)<br>2nd wideband CQI (4 bit) + Best-M CQI (2 bit) if RI>1<br>Best-M index (L bit)<br>Wideband PMI (4 bit) + Best-M PMI (4 bit)<br>(if 8Tx Ant, wideband W2 + Best-M W2 + wideband W1) |
| Higher Layer-configured (Subband CQI) | Mode 3-0<br>RI (only for Open-loop SM)<br>1st wideband CQI (4 bit) + N * subband CQI (2 bit) | Mode 3-1<br>RI<br>1st wideband CQI (4 bit) + N * subbandCQI (2 bit)<br>2nd wideband CQI (4 bit) + N * subbandCQI (2 bit) if RI >1<br>Wideband PMI (4 bit)<br>(if 8Tx Ant, wideband W2 + wideband W1) | Mode 3-2<br>RI<br>1st wideband CQI (4 bit) + N * subbandCQI (2 bit)<br>2nd wideband CQI (4 bit) + N * subbandCQI (2 bit) if RI >1<br>N * Subband PMI (4 bit)<br>(N is the total # of subbands)<br>(if 8Tx Ant, N * subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

ix) Type 7: the UE transmits a CSI-RS resource indicator (CRI) and RI.

x) Type 8: the UE transmits a CRI, an RI and a WB PMI.

xi) Type 9: the UE transmits a CRI, an RI and a precode type indication (PTI).

xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
|---|---|
| '00' | No aperiodic CSI report is triggered |
| '01' | Aperiodic CSI report is triggered for a serving cell |

TABLE 8-continued

| A value of CSI request field | Description |
|---|---|
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
|---|---|
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

Beyond LTE Rel-12, an antenna system using an Active Antenna System (AAS) will be introduced. In the AAS, each antenna is configured as an active antenna including an active circuit. Thus, it is expected that the AAS will reduce interference by changing an antenna pattern according to a situation or will be applied more efficiently. If the AAS is implemented two-dimensionally (2D-AAS), it is possible to change a transmission beam more actively according to the position of a receiver by more efficiently controlling the main lobes of antennas three-dimensionally in terms of an antenna pattern. It is expected that the 2D-AAS enables deployment of an antenna system with multiple antennas arranged vertically and horizontally. A transmission and reception scheme based on the introduction/use of the 2D-AAS is referred to as Elevation Beamforming (EB)/Full Dimension (FD)-Multiple Input Multiple Output (MIMO).

[Class A Channel State Information (CSI) Reporting]

In an FD-MIMO system, an eNB may configure a plurality of Channel State Information-Reference Signal (CSI-RS) resources in one CSI process, for a UE. The UE calculates and feeds back CSI from the CSI-RS resources configured in the single CSI process, considering the resources as one huge CSI-RS resource by aggregating them without regarding the CSI-RS resources as independent channels. For example, the eNB may configure three 4-port CSI-RS resources in one CSI process for the UE, and the UE may consider the resources as one 12-port CSI RS resource by aggregating the resources. The UE may calculate CSI from this resource, using a 12-port PMI, and feed back the CSI.

[Class B CSI Reporting]

In the FD-MIMO system, the eNB may configure a plurality of CSI-RS resources in one CSI process, for the UE. For example, 8 CSI-RS resources may be configured in one CSI process, and carry 4-port CSI-RSs. Since different virtualization is applied to each of the 8 4-port CSI-RSs, different beamforming is applied to each of the 8 4-port CSI-RSs. For example, vertical beamforming is applied to a first CSI-RS at a zenith angle of 100 degrees, and each of the other CSI-RSs are configured with a zenith angle difference of 5 degrees. Thus, vertical beamforming may be applied to an eighth CSI-RS at a zenith angle of 135 degrees.

The UE assumes that each CSI-RS resource is an independent channel, selects one of the CSI-RS resources, calculates CSI based on the selected CSI-RS resource, and reports the CSI to the eNB. Herein, the UE additionally reports the selected CSI-RS to the eNB by a CSI-RS resource Indicator (CRI).

To support enhanced Full Dimension Multiple Input Multiple Output (eFD-MIMO), it is under consideration to modify a legacy diversity transmission scheme. Particularly, the easy use of precoding (e.g., W1) is sought after by introducing a DMRS-based OL MIMO scheme using DMRSs instead of CRSs.

As such a DMRS-based OL MIMO scheme, a semi-OL MIMO scheme is additionally considered besides legacy pure OL MIMO (e.g. Space Frequency Block Coding (SFBC) or Large Delay Cyclic Delay Diversity (LD-CDD)), such as a diversity transmission scheme that uses a report of part of channel state information (CSI) (e.g. W1 for 8-tx Long Term Evolution (LTE) Precoding Matrix Indicator (PMI)) and utilizes the remaining non-reported CSI (e.g. W2 for 8-tx LTE PMI is cycled in units of a Physical Resource Block (PRB)). This is expected to increase a transmission rate from a legacy one in a channel environment showing an intermediate channel variation between pure OL MIMO and close-loop (CL) MIMO. Hereinafter, the OL MIMO scheme refers to the above DMRS-based OL MIMO scheme, especially the pure OL MIMO and the semi-OL MIMO scheme collectively.

OL MIMO Configuration and Signaling

If a precoding-based OL MIMO scheme is used as the OL MIMO scheme, transmission schemes of an eNB differ just in used precoding, and thus this may be used transparently to a UE using DMRSs. Therefore, the eNB indicates by OL MIMO signaling whether the UE is to transmit CSI for pure OL MIMO or semi-OL MIMO to the eNB. For example, if the eNB configures the semi-OL MIMO mode for the UE, the UE reports CSI based on the assumption of semi-OL MIMO to the eNB.

As the OL MIMO scheme, an OL MIMO scheme (e.g. SFBC) which is not based on precoding may be considered. In this case, corresponding signaling may trigger the UE to use a receiving scheme for the OL MIMO scheme as well as to transmit OL-MIMO CSI.

If a plurality of OL MIMO schemes are available, the eNB selects one of the OL MIMO schemes and indicates the selected OL MIMO scheme to the UE. Then, the UE calculates and feeds back CSI on the assumption of the indicated transmission scheme, and receives data on the assumption of the indicated transmission scheme.

A. Transmission Mode (TM) for Semi-OL MIMO

A TM is formed separately for DMRS-based OL MIMO. This TM is identical to a legacy diversity scheme, TM 2 or TM 3. The TM may be configured for the UE by RRC signaling so that the UE may use a corresponding diversity scheme. In this case, separate TMs may be configured for pure OL MIMO and semi-OL MIMO.

i. If a new TM is configured, the corresponding OL MIMO TM may be managed by the same number of pieces of DCI as for legacy TMs, and no additional DCI is allocated for OL MIMO assignment for other TMs. Therefore, compared to the legacy TMs, no additional blind detection overhead of DCI is produced. However, a TM itself should be changed to use a different transmission scheme and thus transition between pure OL MIMO and semi-OL MIMO or transition to or from a different transmission scheme may be slow.

In this case, the UE may select an OL MIMO transmission scheme (e.g. pure OL MIMO, or semi-OL MIMO) favorable to it and request the eNB to use a corresponding OL MIMO TM by RRC signaling.

Or a mechanism in which the eNB asks the UE about its OL MIMO preference and the UE reports corresponding signaling to the eNB based on a measurement or the like may be defined. The eNB may select an appropriate OL MIMO TM through the mechanism.

B. OL MIMO Scheme Included in Legacy DMRS Transmission Schemes

The corresponding DMRS-based OL MIMO scheme is included in the legacy DMRS transmission schemes (TM 7, 8, 9, and 10), and is on/off by signaling.

i. Signaling Media

1. Signaling by DCI

New DCI for semi-OL MIMO is added, and the UE is indicated to use the corresponding transmission scheme just by blind detection of the new DCI.

If the new DCI has a different length from that of legacy DCI used for the corresponding TM due to an additional bit field, the UE may require too many blind detections.

The corresponding OL MIMO scheme may be enabled/disabled by overriding some field of the legacy DCI.

DCI for OL MIMO having the same length as that of the legacy DCI but different content may be used. To distinguish the DCI for OL MIMO from the legacy DCI, the OL MIMO DCI uses a different RNTI from that of the legacy DCI. For the example, if the eNB uses the OL MIMO DCI, the OL MIMO DCI may use a Radio Network Temporary Identifier (RNTI) for which (ue_id+1) is used (ue_id may be, for example, a Cell-RNTI (C-RNTI)).

2. The OL MIMO scheme may be indicated to the UE by higher layer signaling such as RRC signaling or MAC signaling.

ii. Signaling Methods

1. On/off of the OL MIMO mode by 1-bit signaling
2. Signaling of a PMI feedback bit size A later-described PMI bit size may be signaled to the UE. The UE may switch between transmission schemes, particularly, a plurality of OL MIMO schemes according to the bit size.

Channel State Information (CSI)

If the semi-OL MIMO mode is indicated to the UE in the above methods, the UE reports CSI to the eNB, on the assumption of the mode. Herein, the CSI is changed as follows.

A. Rank Indicator (RI)

If a single scheme is used for semi-OL MIMO, the UE may feed back an RI within a maximum rank because the maximum rank is limited (e.g. maximum rank=2).

Particularly, a different semi-OL MIMO scheme may be used according to a rank. For example, if rank=1, an SFBC-based scheme may be used, and if rank>1, another scheme, particularly precoding cycling may be used, when possible, along with layer permutation. That is, the UE may select a semi-OL MIMO scheme suitable for the UE and indicate the selected scheme to the eNB by an RI.

B. Partial PMI

In the semi-OL MIMO scheme, only a part of a PMI is actually used and the other part of the PMI is cycled, thus achieving diversity. A cycling pattern may be predefined or indicated to the UE by RRC signaling or the like.

For this purpose, the UE may report to the eNB only a partial PMI to be actually used, instead of a whole PMI. For example, in the case where a codeword is represented in n bits and thus a total of $2^n$ codewords are defined, a total of k feedback bits are available, the UE reports upper k bits instead of n bits of a legacy codeword to the eNB and operates on the assumption that a part corresponding to the remaining lower (n−k) bits is cycled.

Particularly, if a dual-codebook structure is used, W2, a selector within W2, or a co-phase term may be considered as a precoding unit to be cycled for diversity. Thus, there may be largely the following three semi-OL MIMO schemes.

a. W2 cycling: feedback W1
b. Co-phase cycling: feedback W1+co-phase term
c. Selector cycling: feedback W1+selector In this case, a selector and/or a co-phase term reported conventionally in W2 may be fed back along with W1 That is, the selector and/or the co-phase may be fed back in a long term along with W1, thereby reducing feedback overhead, or in a short term along with W1, thereby fast following a channel variation.

i. If a Linear Combination (LC) codebook is used for implicit feedback, the UE may report to the eNB a non-zero value as a coefficient corresponding to a codebook index to be used for cycling and a zero value as a coefficient corresponding to a codebook index not to be used for cycling. In this case, the eNB performs cycling using a codeword corresponding to the codebook index reported as the non-zero value.

a. Herein, indicated codewords may be cycled without linear combination and used for transmission.

b. For cycling using linear combination, a cycling LC pattern may be predefined between the eNB and the UE or defined by higher layer signaling such as RRC signaling.

C. CQI with OL: the UE may calculate and report a Channel Quality Indicator (CQI) on the assumption of semi-OL. In this case, a CQI is calculated and reported in consideration of a cycling pattern pre-agreed or signaled by RRC signaling or the like.

D. Explicit Feedback

If semi-OL MIMO is used in the case of explicit feedback, cycling of a PMI index does not mean precoding cycling any more. Therefore, a separate scheme for precoding cycling is needed. In the case of explicit feedback, the UE calculates a CQI on the assumption of precoding (e.g., Singular Value Decomposition (SVD)) using a channel measured by the UE. Therefore, if the UE calculates a semi-OL CQI, the UE may derive an estimated PMI for the case of using the corresponding channel, calculate a CQI on the assumption that the eNB uses the corresponding PMI along with an additional OL PMI, and report the calculated CQI to the eNB. That is, the UE uses an estimated PMI×OL-PMI as an actual PMI in calculating a CQI. Herein, the OL-PMI may be cycled.

1. The UE may directly select an OL-PMI and feed back the selected OL-PMI. For this purpose, a plurality of OL-PMI sets each including PMIs to be cycled are set, and the UE may report the index of a preferred OL-PMI set to the eNB.

2. The eNB may signal an OL-PMI to the UE. For this purpose, a plurality of OL-PMI sets each including PMIs to be cycled are set, and the eNB may indicate the index of a corresponding OL-PMI set to the UE. The OL-PMI index may be included in OL-MIMO signaling. Further, the UE may be configured to receive the corresponding OL-PMI, calculate CSI (e.g., CQI) by using/assuming the OL-PMI, and report the CSI to the eNB.

3. An OL-PMI may be predefined. In this case, additional feedback/signaling is not needed.

i. The UE may transmit a rank-restricted feedback. Herein, rank restriction may be predefined (e.g., maximum rank=2) or defined by RRC signaling or the like. Particularly, the rank restriction may be defined according to a used OL MIMO scheme.

3. SFBC Orphan REs in the Case of DMRS-Based Transmission

Before a description of a proposed method, a description of data Rate Matching (RM) of the legacy TM2 SFBC in the current LTE standard is given below.

TABLE 1

6.4 Physical downlink shared channel
(omitted)
In mapping to resource elements, if the DCI associated with the PDSCH uses the C-RNTI or semi-persistent C-RNTI and transmit diversity according to clause 6.3.4.3 is used, resource elements in an OFDM symbol assumed by the UE to contain CSI-RS shall be used in the mapping if and only if all of the following criteria are fulfilled:
(condition 1) there is an even number of resource elements for the OFDM symbol in each resource block assigned for transmission, and
(condition 2) the complex-valued symbols $y^{(p)}(i)$ and $y^{(p)}(i + 1)$, where i is an even number, can be mapped to resource elements (k, l) and (k + n, l) in the same OFDM symbol with n < 3.

According to a legacy RM scheme, there is no specific description of a PDSCH OFDM symbol region in which there are no CSI-RSs. It is because condition 1 and condition 2 of the legacy RM scheme are always satisfied in PDSCH OFDM symbols without CSI-RSs. Since the two conditions are or are not satisfied in PDSCH OFDM symbols with CSI-RSs according to scheduling, the conditions are checked only for the PDSCH OFDM symbols with CSI-RSs as described in the above table. If condition 1 is not satisfied and an odd number of REs exist, an RE of the last subcarrier of each RB is generally called an orphan RE, and an RE that does not satisfy condition 2 and thus is excluded from SFBC data transmission is also called an orphan RE.

If DMRS-based (semi-) SFBC is used, the two conditions may or may not be satisfied in OFDM symbols with DMRSs. Therefore, the two conditions need to be checked. For this purpose, the existing specification needs to be modified and added as follows.

TABLE 2

6.4 Physical downlink shared channel
(omitted)
In mapping to resource elements, if the DCI associated with the PDSCH uses the C-RNTI or semi-persistent C-RNTI and transmit diversity based on DMRS is used, resource elements in an OFDM symbol assumed by the UE to contain CSI-RS or DMRS shall be used in the mapping if and only if all of the following criteria are fulfilled:
(condition 1) there is an even number of resource elements for the OFDM symbol in each resource block assigned for transmission, and
(condition 2) the complex-valued symbols $y^{(p)}(i)$ and $y^{(p)}(i + 1)$, where i is an even number, can be mapped to resource elements (k, l) and (k + n, l) in the same OFDM symbol with n < 3.

Now, a description will be given of a problem encountered when RM is performed for DMRS-based SFBC transmission according to [Table 2]. In the case of semi-OL MIMO transmission, a different diversity scheme may be used according to a rank. For example, if rank=1, SFBC may be used, and if rank>1, precoding cycling (+ layer permutation) may be used.

Herein, if DMRSs are used, the use of SFBC leads to failed RE pairing, thus causing an orphan RE. Or it occurs that condition 2 is not satisfied because the spacing between SFBC RE pairs is 2 or more REs as in the case where all DMRS ports (i.e., ports 7, 8, 9, 10, 11, 12, 13, and 14) are used. Especially, FIGS. 6 and 7 illustrate an exemplary generation of four orphan REs when DMRS ports 7, 8, 11, and 13 are used.

Figure 6:
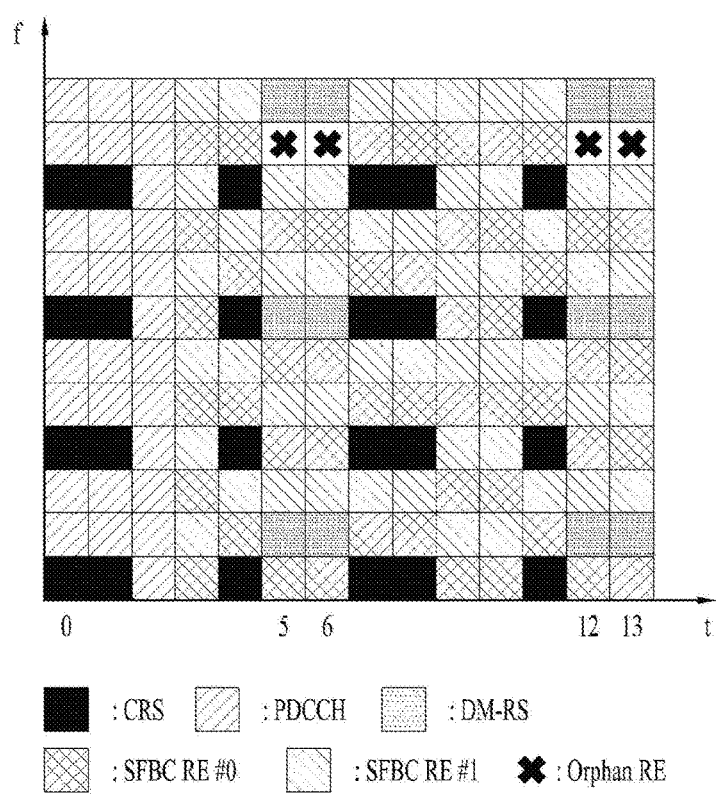
FIGS. 6 and 7 illustrate orphan Resource Elements (REs), when Demodulation Reference Signal (DMRS)-based transmission schemes are used.
Figure 7:
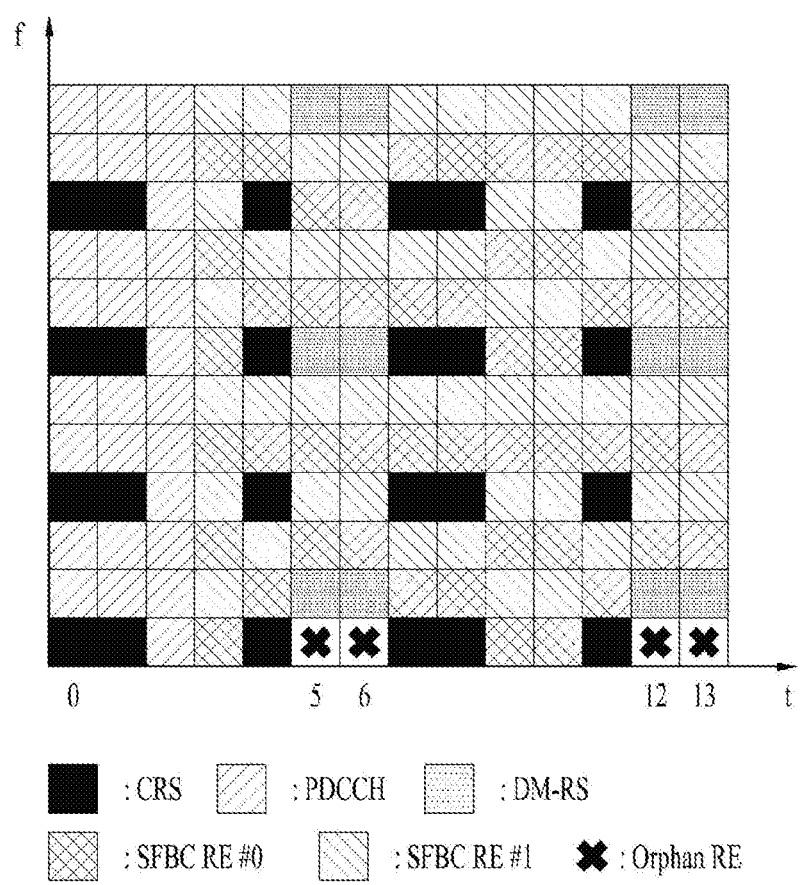

In this case, if RM is performed in the manner described in [Table 2], symbols having orphan REs, that is, symbols 5, 6, 12, and 13 illustrated in FIGS. 6 and 7 are not used. As a result, too much resources are wasted. Accordingly, there is a need for a method for optimizing RM in order to use SFBC in the DMRS-based semi-OL MIMO scheme.

[Rate Matching of Orphan RE]

If an orphan RE is produced, some RE of a corresponding symbol is not transmitted for data transmission, thereby achieving SFBC pairing. Or the afore-described resource consumption may be overcome by setting some RE of the corresponding symbol as 'an RE not to be considered when the number of REs is counted in condition 1 of [Table 2]'. Corresponding REs are given as follows.

A. When DMRS port 7, 8, 11, or 13 is used (i.e. 12 DMRS REs per RB are used): REs labeled with x in FIG. 6 or REs labeled with x in FIG. 7.

In this case, if SFBC pairs are allocated like a pattern illustrated in FIG. 3, proximity may be maintained between the REs of an SFBC pair, and thus better performance may be expected. Therefore, it is preferred to rate-match an orphan RE, an RE isolated by a DMRS, that is, in the first RE of an RB among symbols with DMRSs, as illustrated in FIG. 7.

As a result, since each of symbols 5, 6, 12, and 13 has an even number of REs, condition 1 is satisfied and thus the remaining REs except for REs labeled with x are still used for data transmission.

Figure 8:
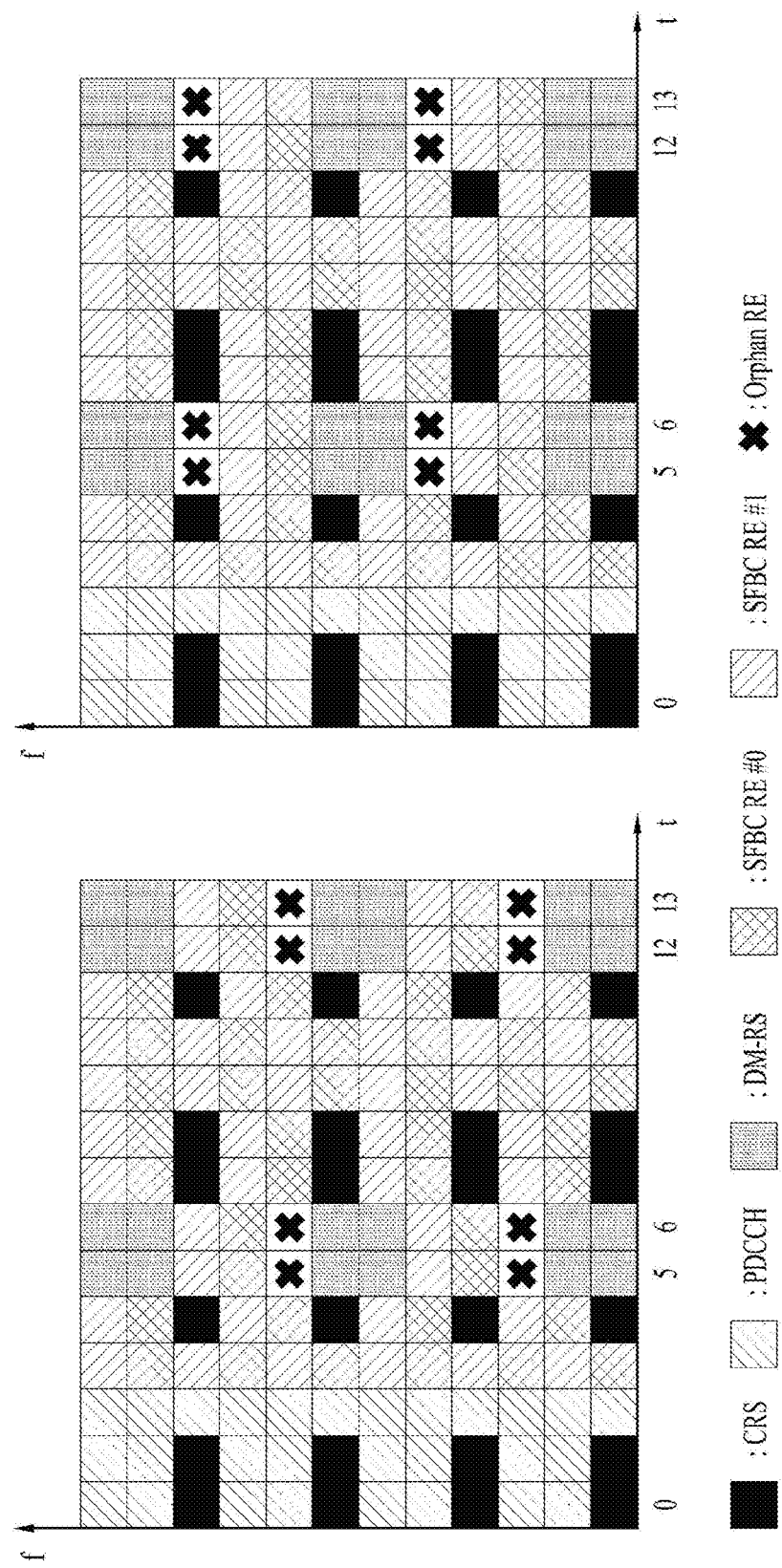
FIG. 8 illustrates orphan REs, when a DMRS-based transmission scheme is used.

B. When a part or all of DMRS ports 7, 8, 11, and 13 or a part or all of DMRS ports 9, 10, 12, and 14 are used (i.e., 24 DMRS REs per RB are used): REs labeled with x in FIG. 8.

As a result, since each of symbols 5, 6, 12, and 13 has an even number of REs, condition 1 is satisfied and thus the remaining REs except for REs labeled with x are still used for data transmission.

If rate matching is performed in this manner, the eNB does not use corresponding REs in data transmission, and the UE attempts data decoding, assuming that data is not transmitted in the REs.

[Timewise SFBC RE Pair Mapping]

Figure 9:
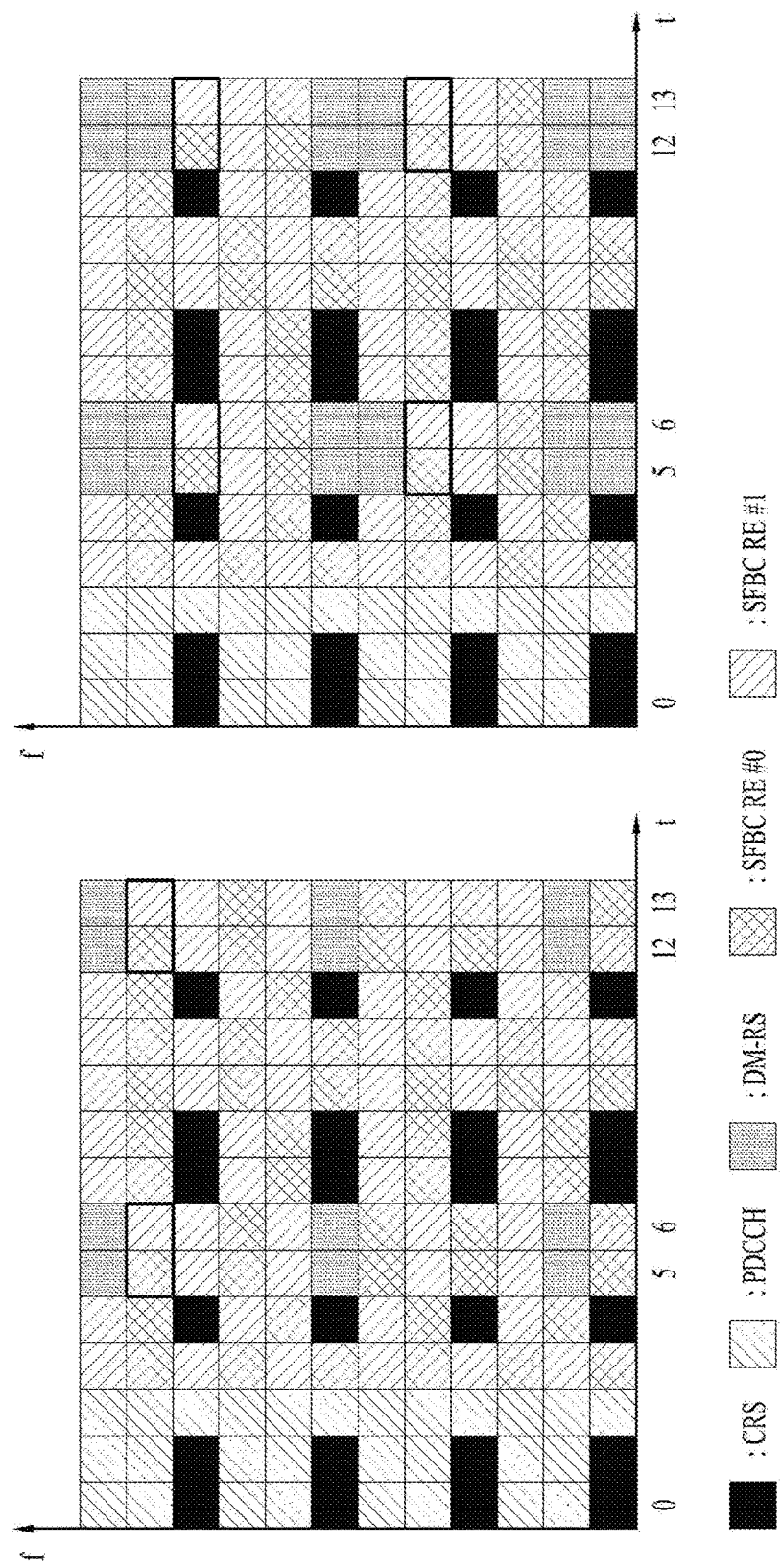
FIGS. 9 and 10 illustrate Space Frequency Block Coding (SFBC) RE pairing, when a DMRS-based transmission scheme is used.

SFBC RE pairs may be arranged timewise in the REs labeled with x (the right drawings of FIGS. 6 and 8) in the above [Rate matching of orphan RE]. FIG. 9 illustrates exemplary timewise grouping of SFBC RE pairs.

Figure 10:
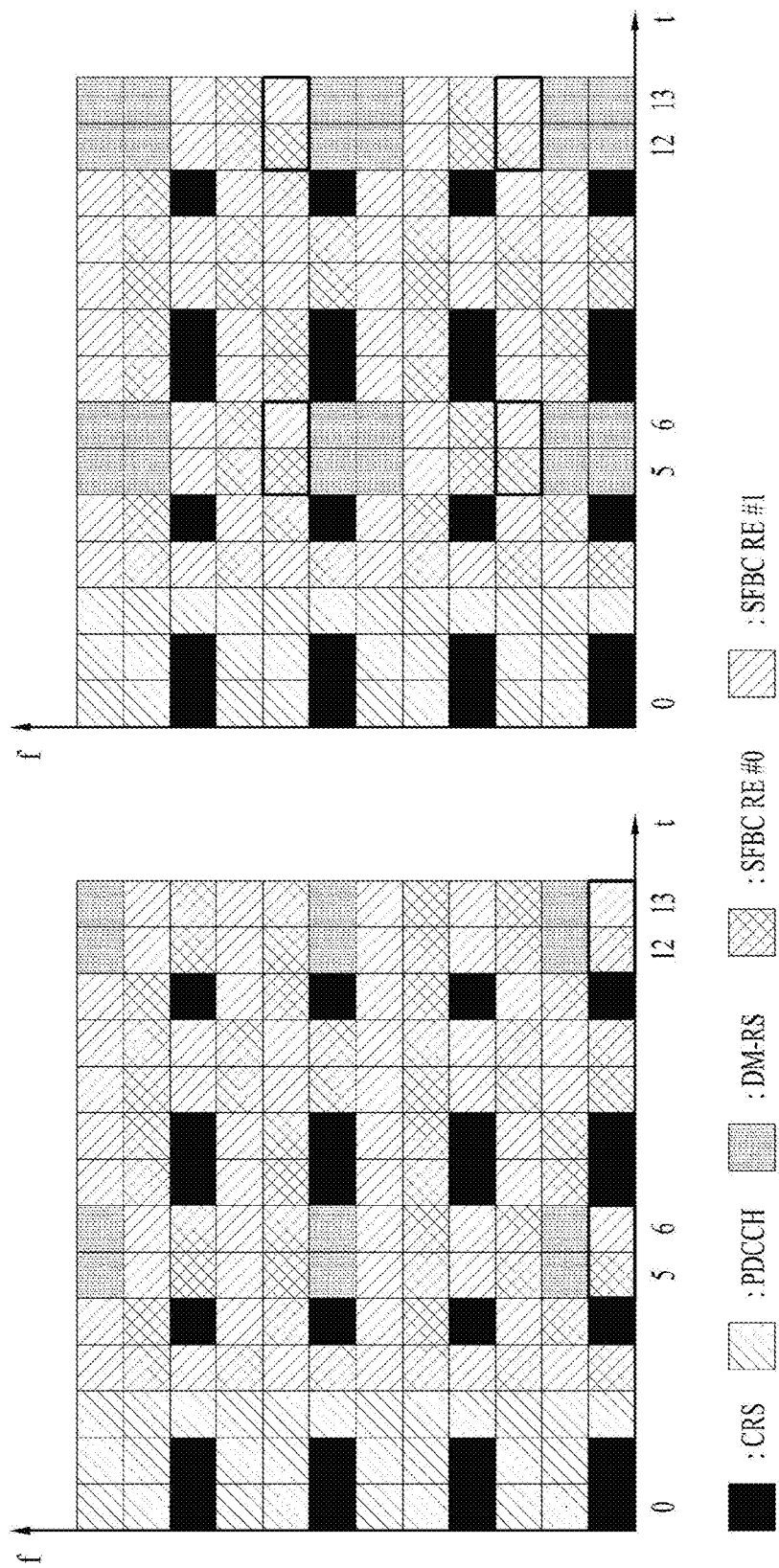

Or SFBC RE pairs are arranged timewise and then frequency-wise in an RE block having orphan REs (e.g. FIG. 10). In this case, data mapping to the corresponding REs may be performed in the last place after data mapping to the other REs is completed.

If only antenna ports 7, 8, 11, and 13 are used, better performance may be expected from the method of FIG. 7 due to proximity maintained between SFBC pair REs, compared to the method of FIG. 6. Therefore, it is preferred to map SFBC pairs to RE pairs including, an RE isolated by a DMRS, that is, the first RE of an RB among symbols carrying DMRSs.

Figure 11:
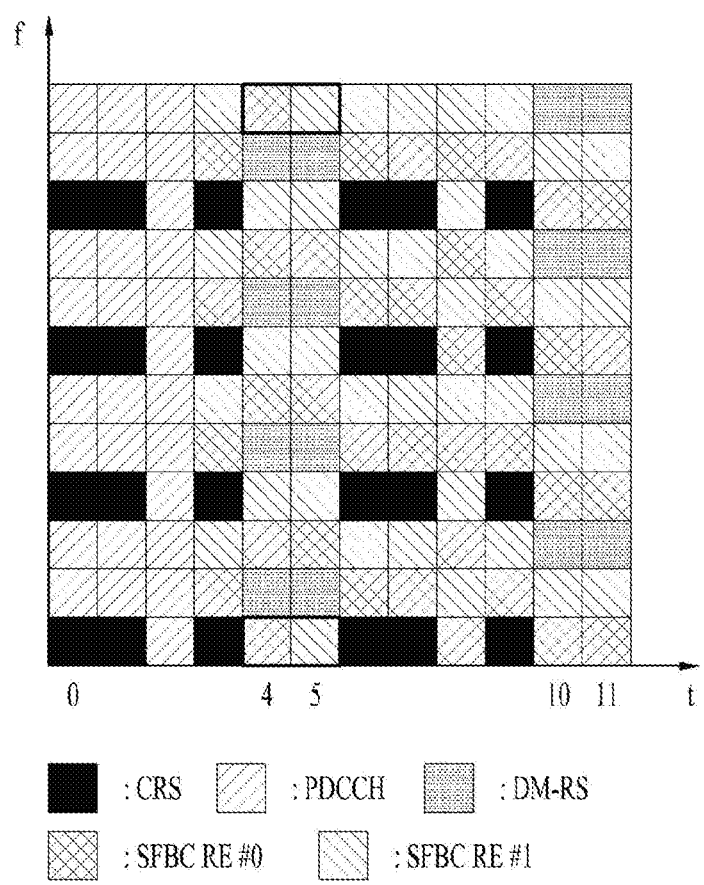
FIG. 11 illustrates timewise SFBC RE pairing in an extended Cyclic Prefix (CP) case.

In an extended CP case, it is not necessary to puncture REs. However, timewise allocation may be performed as depicted in FIG. 11 for the first/last REs of symbols 4 and 5, for proximity of SFBC pairs.

Figure 12:
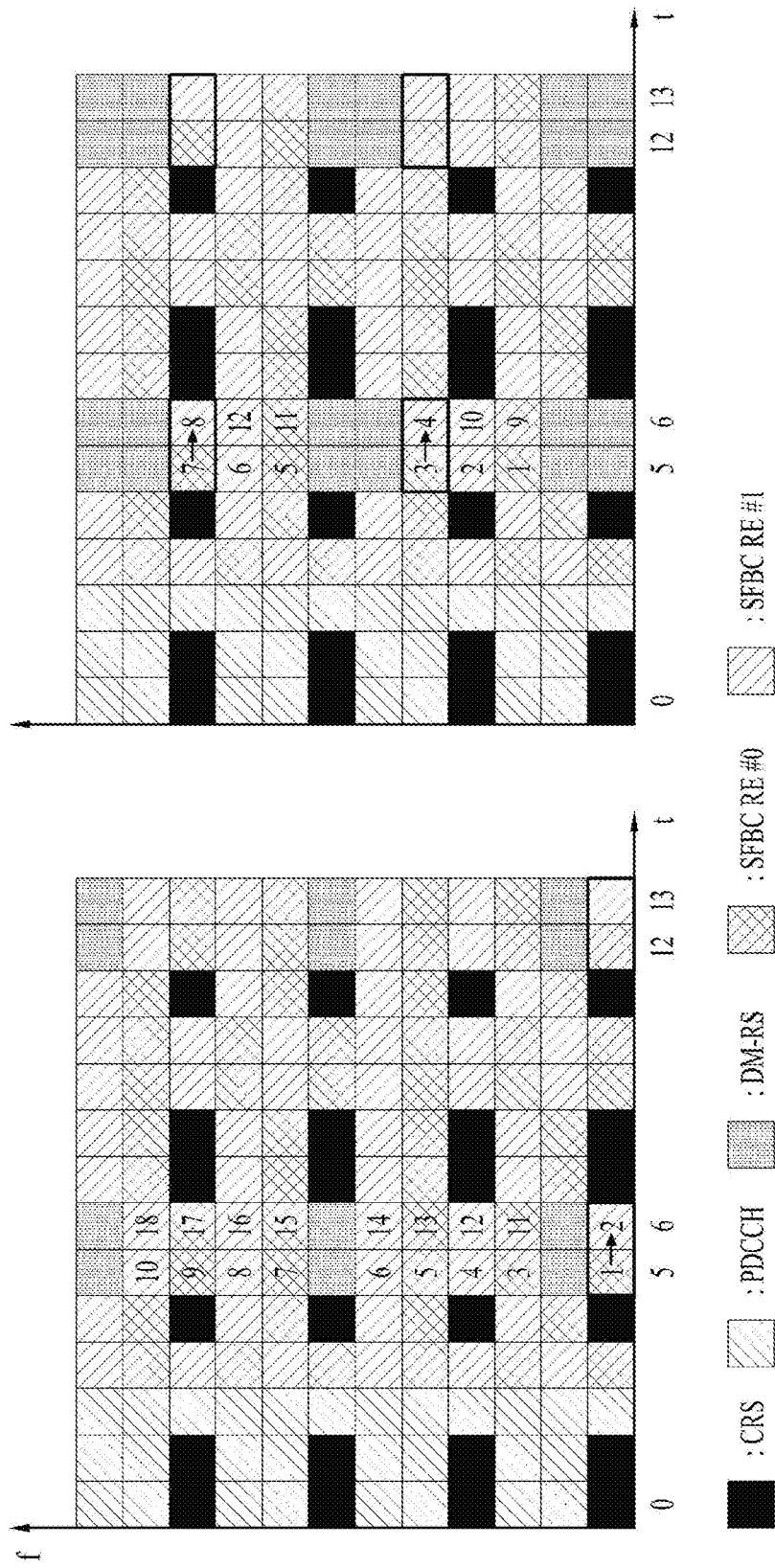
FIGS. 12, 13, and 14 illustrate data allocation for timewise SFBC RE pairing.

If SFBC RE pair allocation is performed in symbols having orphan REs, the eNB allocates data to REs other than orphan RE pairs in a conventional manner. However, when data is to be allocated to an orphan RE, the data is allocated only to an SFBC pair of the orphan RE and the afore-described orphan RE in an adjacent symbol, that is, an orphan RE pair in adjacent symbols of the same carrier. For example, this operation is performed as indicated by bold squares in symbols 5 and 6 of FIG. 12.

The above operation may bring the effect of reducing burst errors by separating a timewise SFBC pair expected to have a high error probability in a symbol sequence.

Figure 13:
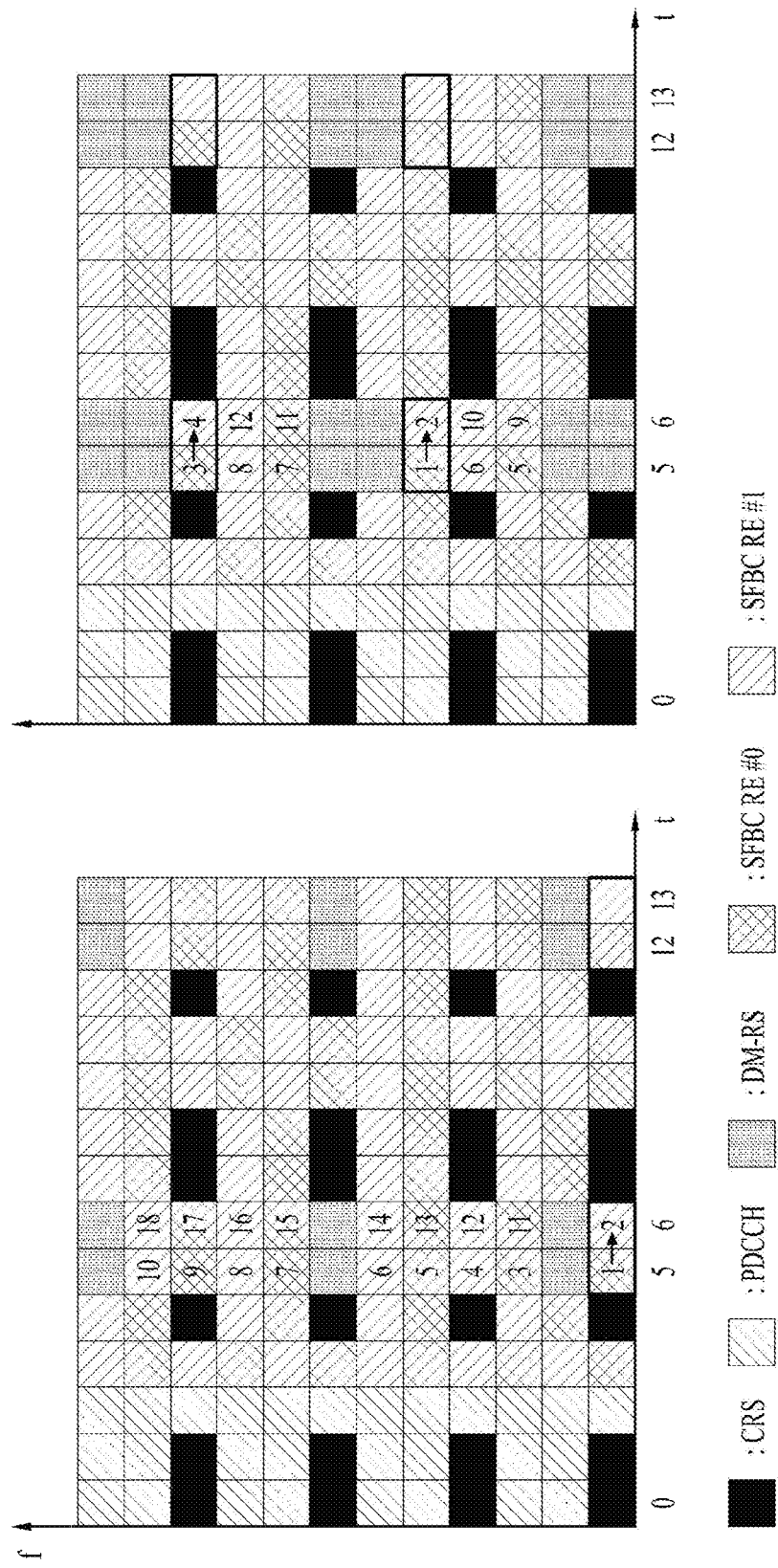
Figure 14:
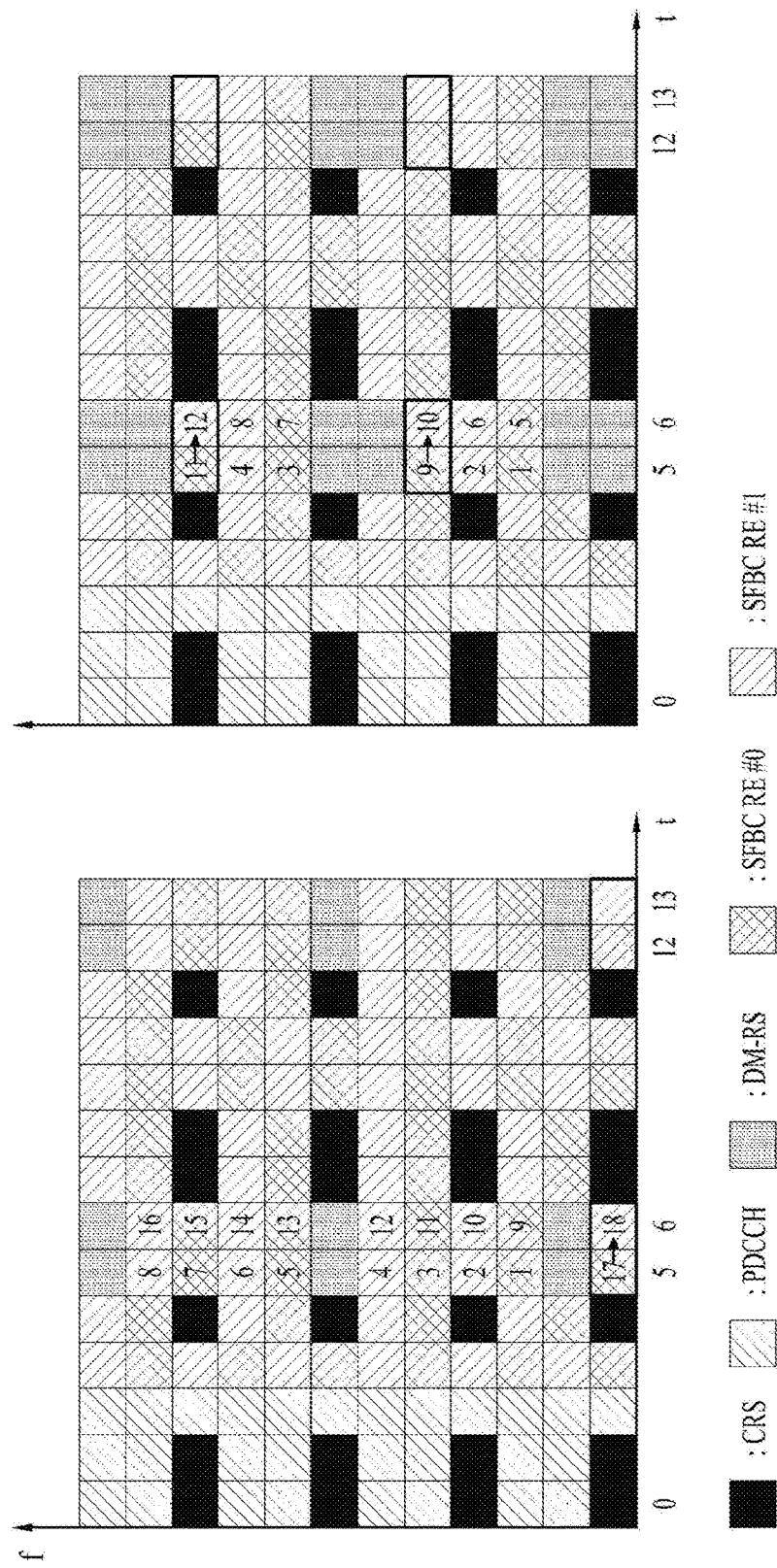

Or for simplicity of data allocation, timewise SFBC pairs may be allocated at one time before or after normal REs in corresponding symbol pairs (e.g., symbols 5 and 6, and symbols 12 and 13). That is, in this case, data symbols transmitted in timewise SFBC pairs are adjacent to each other in a data sequence. FIGS. 13 and 14 illustrate exemplary allocations of timewise SFBC pairs before and after data allocation to normal REs, respectively.

If timewise SFBC RE pairs are used in the above manner, the UE may attempt to decode data in a used data RE allocation order.

If a plurality of allocation schemes are used, the eNB may indicate an allocation order to be used to the UE. The allocation order may be indicated by higher-layer signaling such as RRC signaling.

Figure 15:
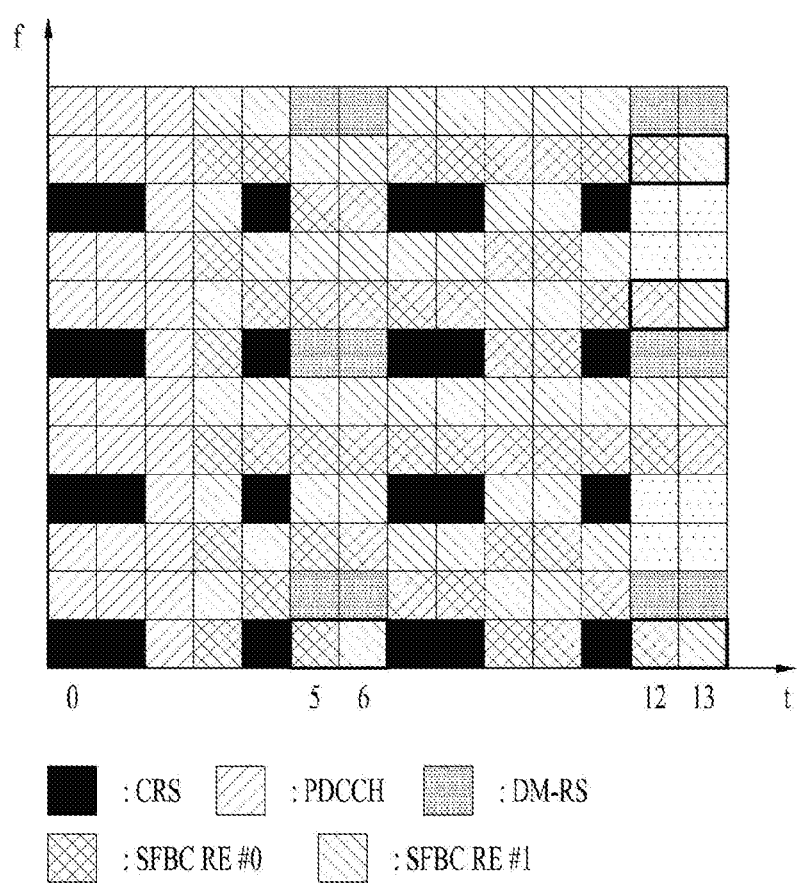
FIG. 15 illustrates orphan REs in a Resource Block (RB) to which both DMRSs and Cell-specific RSs (CRSs) are allocated.

If DMRSs are transmitted along with CSI-RSs, different timewise SFBC pairs may be considered according to the numbers of various CSI-RS ports. Particularly, RE pairs that do not satisfy (condition 2) may be used as timewise SFBC pairs, and the number and positions of the SFBC pairs may vary according to the numbers of DMRS ports and CSI-RS ports. For example, if 1-port DMRSs and 8-port CSI-RSs are used in symbols 12 and 13, a plurality of timewise SFBC pairs may be used as illustrated in FIG. 15.

Instead of defining a plurality of different principle/mapping patterns for different situations, symbols in which CSI-RSs and DMRSs are transmitted simultaneously may be restricted to timewise SFBC pair allocation only.

According to the technology, even when (Non-Zero Power (NZP) and/or Zero Power (ZP)) CSI-RSs are used together (e.g., configured in corresponding symbols), an operation of rate-matching REs including corresponding CSI-RS REs, similarly to the above proposed operation, may be defined/configured. That is, an RM operation as described above may be configured along with an operation of emptying all symbols as in a legacy mode, and switching may occur between these operations.

In other words, if the number of the remaining data REs except for DMRSs and (NZP and/or ZP) CSI-RS REs (condition 1 in [Table 1]) is an odd number, the above method may be applied to produced orphan REs.

In a similar sense, it may be determined according to the number of CSI-RSs whether to apply the above method. Since DMRS port 7 and/or 8 is used, if the number of CSI-RS REs is an even number, the number of data REs is an odd number. Therefore, the above method may be restricted to the case where the number of CSI-RS REs in a symbol carrying DMRSs is an even number.

For this purpose, the eNB may indicate to the UE which one of the above alternatives to be used by higher layer signaling such as RRC signaling. This is done for transmission flexibility. Specifically, the eNB may indicate to the UE "orphan-RE rate matching" methods and which one of the "orphan-RE rate matching" methods is to be used. And/or the eNB may directly indicate the position of a specific orphan RE so that the UE may perform the above-described operation.

Further, the following agreement has been made for orphan REs in the 3GPP RAN1 #87 meeting.

TABLE 3

| Proposal |
|---|
| For DMRS-based semi-open-loop,<br>  Orphan RE due to 2 ports CSI-RS:<br>    Same procedure as in Rel.10<br>  Orphan RE due to DMRS: down-select from<br>    Option A: 1 orphan RE per allocated RB<br>    Option B: 1 orphan RE in the last allocated RB (if<br>    number of allocated RB is odd)<br>    Option C: 1 orphan RE in the last allocated RB of every<br>    block of continuous RB allocation with an odd RB<br>    number<br>    Other options not precluded<br>  Location of orphan RE: corresponding to DMRS ports 9/10<br>  of the at DMRS CDM group (see next slide) |

Among three options for an orphan RE caused by DMRSs, that is,

Option A: one orphan RE per allocated RB

Option B: one orphan RE in the last allocated RB (when an odd number of RBs are allocated)

Option C: one orphan RE in the last allocated RB of each block in a contiguous RB allocation having an odd number of RBs, the eNB may select an option to be used and indicate the selected option to the UE. The option may be indicated to the UE by higher layer signaling such as RRC signaling.

In addition to the above options, the following option may be considered.

Option D: one orphan RE in the last allocated RB of each block in a contiguous RB allocation having an odd number of RBs in each PRB group.

That is, if PRB groups each including K RBs are predefined in a total band, and an odd number of allocated contiguous RBs exist in each PRB group, one orphan RE in the last of the RBs is subjected to muting or Time Division Multiplexing (TDM) Space Time Block Coding (STBC).

If PRB groups each including K RBs are predefined in the total band, and one non-contiguously allocated RB exists in each PRB group, one orphan RE of the RB is subjected to muting or TDM-STBC.

If the total band is divided into M PRB groups, the above operation is performed for each PRB group.

That is, if Option D is applied, if the number of contiguously allocated RBs is an odd number in each PRB group, the eNB may perform transmission by applying the above orphan RE to the last RB. If the number of contiguously allocated RBs is an odd number in each PRB group, the UE may also attempt data decoding by applying the above orphan RE to the last RB. The above PRB groups may be predetermined according to a system band, or may be formed to a size equal to the size of a PRB bundle. Therefore, imperfect SFBC pairing caused by an estimated channel varying rapidly at a PRB bundle boundary may be overcome.

Figure 16:
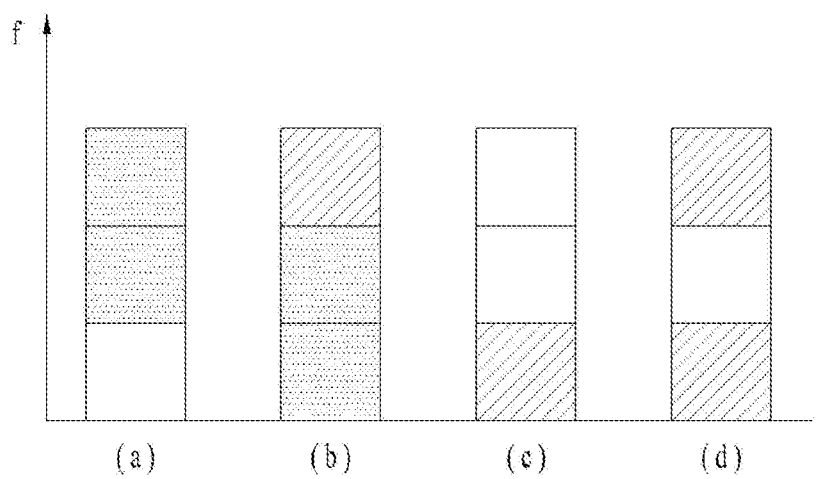
FIG. 16 illustrates the positions of RBs with orphan REs in Physical Resource Block (PRB) bundles.

FIG. 16 illustrates an exemplary case in which RPB group=RPB bundle and a PRB bundle size=3. In (a) of FIG. 16, since there are 2 contiguous RBs in a PRB bundle, the above method is not used. In (b) of FIG. 16, since there are 3 contiguous RBs in a PRB bundle, the above method is used in the last RB. In (c) of FIG. 16, since there is 1 contiguous RB in a PRB bundle, the above method is used in the RB. In (d) of FIG. 16, since there is 1 contiguous RB in each PRB bundle, the above method is used in each RB.

Figure 17:
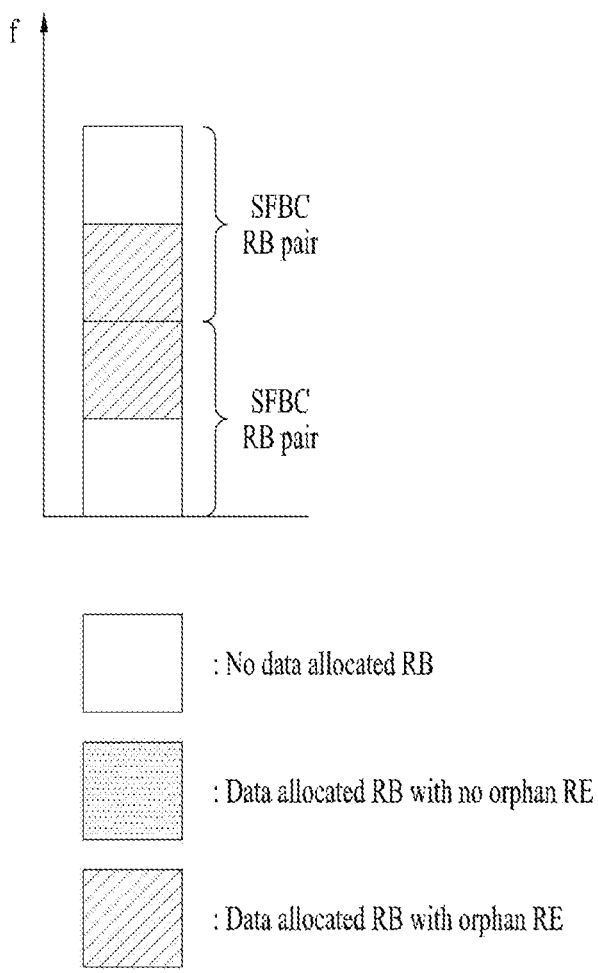
FIG. 17 illustrates the positions of RBs with orphan REs in SFBC RB pairs.

In another example, if a PRB group is predefined or indicated by RRC signaling, to prevent orphan REs, its size and starting point may not be changed according to data allocation. In this case, a case depicted in FIG. 17 may further be considered.

That is, PRB groups each including 2 RBs may be formed to prevent SFBC-caused orphan REs. If a PRB bundle includes 4 RBs, although 2 RBs are contiguous in the PRB bundle, but 1 RB is contiguous in each PRB group. Thus, each RB has an orphan RE and thus the above method should be used. In this case, a PRB group should be selected from factors of the PRB bundle.

Figure 18:
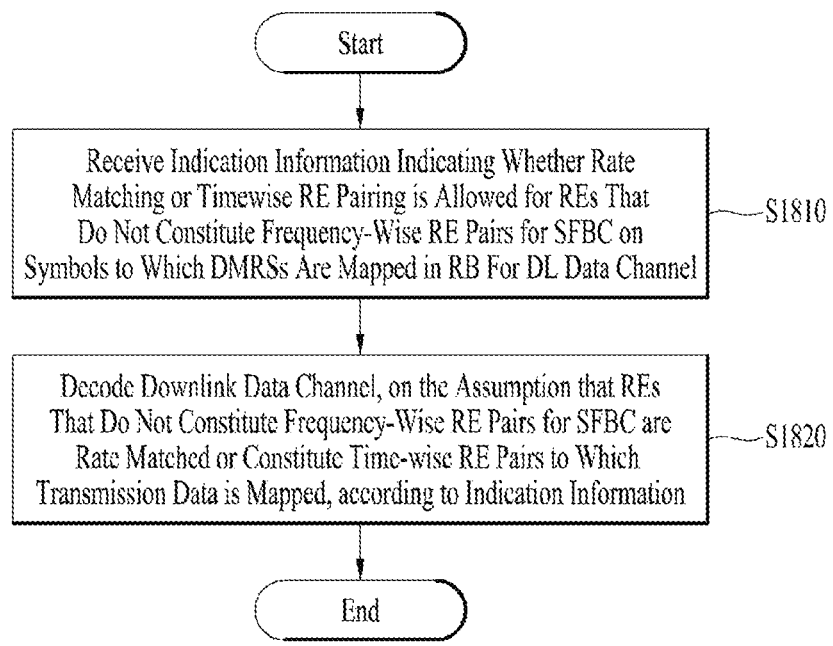
FIG. 18 is a flowchart illustrating an operation of a User Equipment (UE) according to an embodiment of the present disclosure.

FIG. 18 illustrates an operation according to an embodiment of the present disclosure.

FIG. 18 is about a method for receiving a DL signal according to a DMRS-based transmission scheme in a wireless communication system.

A UE may receive indication information indicating whether rate matching or timewise RE pairing is allowed for REs that do not form frequency-wise RE pairs for SFBC in symbols to which DMRSs are mapped in an RB for a DL data channel (S1810).

The UE may decode the DL data channel, assuming that the REs that do not form frequency-wise RE pairs for SFBC have been rate-matched, or have formed timewise RE pairs and have been mapped to transmission data, according to the indication information (S1820).

Further, the UE may set first REs of symbols to which DMRSs are mapped in each RB, as the REs that do not form frequency-wise RE pairs for SFBC.

Further, data may be allocated to REs formed as timewise RE pairs from among the REs that do not form frequency-wise RE pairs for SFBC, before data is allocated to the remaining REs of each of the symbols to which DMRSs are allocated. Or data may be allocated to REs formed as timewise RE pairs from among the REs that do not form frequency-wise RE pairs for SFBC, after data is allocated to the remaining REs of each of the symbols to which DMRSs are allocated.

Further, if an odd number of RBs are allocated to the UE, the RB may be a last RB.

Further, if RB blocks each including an odd number of contiguous RBs are allocated to the UE, the RB may be a last RB of each RB block.

Further, the RB belongs to RB groups each including a predetermined number of RBs for the UE. If RB blocks each having an odd number of contiguous RBs in each RB group are allocated, the RB may be a last RB of each RB block.

While embodiments of the present disclosure have been described briefly with reference to FIG. 18, the embodiments related to FIG. 18 may include at least a part of the foregoing embodiment(s), alternatively or additionally.

Figure 19:
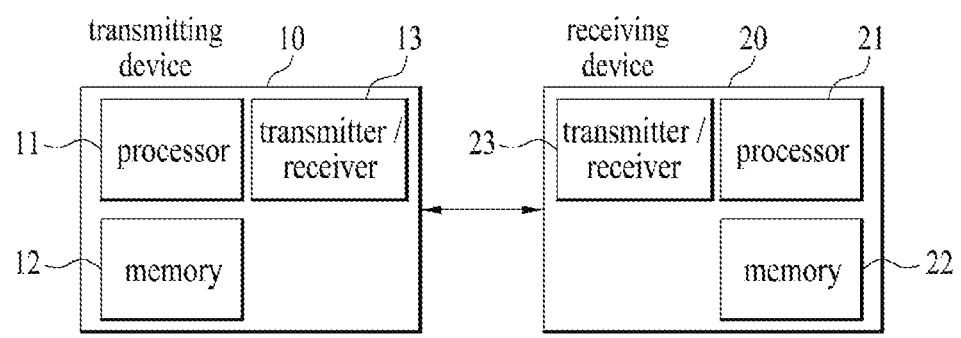
FIG. 19 is a block diagram of apparatuses for implementing an embodiment(s) of the present disclosure.

FIG. 19 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

What is claimed is:

1. A method for receiving a downlink signal according to a Demodulation Reference Signal (DMRS)-based transmission scheme, performed by a mobile terminal, in a wireless communication system, the method comprising:
   receiving indication information indicating that time-wise Resource Element (RE) pairing is allowed for first REs;
   receiving allocation order information,
   wherein the allocation order information includes an allocation order of data between the first REs and second REs when the time-wise RE pairing is allowed; and
   decoding the data based on the indication information and the allocation order information,
   wherein the first REs are REs that do not constitute frequency-wise RE pairs for space frequency block coding (SFBC) in physical downlink shared channel (PDSCH) orthogonal frequency division multiplexing (OFDM) symbols to which the DMRSs are mapped,
   wherein the second REs are REs that constitute frequency-wise RE pairs for the SFBC in the PDSCH OFDM symbols to which the DMRSs are mapped, and
   wherein the data is allocated to the first REs in one or more pairs of two OFDM symbols by a subcarrier in a time domain, and then allocated to the second REs in one ore more frequency-wise RE pairs with increasing order of a frequency domain index.

2. A mobile terminal for receiving a downlink signal according to a Demodulation Reference Signal (DMRS)-based transmission scheme in a wireless communication system, the mobile terminal comprising:
   a transmitter and a receiver; and
   a processor configured to control the transmitter and the receiver,
   wherein the processor is further configured to:
      receive indication information indicating that timewise Resource Element (RE) pairing is allowed for first REs,
      receive allocation order information,
      wherein the allocation order information includes an allocation order of data between the first REs and second REs when the time-wise RE pairing is allowed; and decode the data based on the indication information and the allocation order information, wherein the first REs are REs that do not constitute frequency-wise RE pairs for space frequency block coding (SFBC) in physical downlink shared channel (PDSCH) orthogonal frequency division multiplexing (OFDM) symbols to which the DMRSs are mapped, wherein the second REs are REs that constitute frequency-wise RE pairs for the SFBC in the PDSCH OFDM symbols to which the DMRSs are mapped, and wherein the data is allocated to the first REs in one or more pairs of two OFDM symbols by a subcarrier in a time domain, and then allocated to the second REs in one ore more frequency-wise RE pairs with increasing order of a frequency domain index.

* * * * *